(12) United States Patent
Chen et al.

(10) Patent No.: US 8,738,026 B2
(45) Date of Patent: May 27, 2014

(54) WIRELESS TRANSMISSION SYSTEM, DEVICE AND METHOD

(75) Inventors: Yen-Wen Chen, Taoyuan County (TW); I-Hsuan Peng, Taoyuan County (TW)

(73) Assignee: National Central University, Taoyuan County (TW)

( * ) Notice: Subject to any disclaimer, the term of this patent is extended or adjusted under 35 U.S.C. 154(b) by 368 days.

(21) Appl. No.: 12/953,412

(22) Filed: Nov. 23, 2010

(65) Prior Publication Data

US 2012/0040626 A1 Feb. 16, 2012

(30) Foreign Application Priority Data

Aug. 12, 2010 (TW) .................................. 99126966

(51) Int. Cl.
*H04W 24/00* (2009.01)
(52) U.S. Cl.
USPC ..................................................... 455/456.1
(58) Field of Classification Search
CPC ..................................................... H04B 7/086
USPC ........................................ 455/69, 456.1, 566
See application file for complete search history.

(56) References Cited

U.S. PATENT DOCUMENTS

| | | | |
|---|---|---|---|
| 7,676,241 B2 * | 3/2010 | Bennett ......................... | 455/522 |
| 8,098,155 B2 * | 1/2012 | Gloo et al. ............... | 340/539.21 |
| 8,160,610 B2 * | 4/2012 | Harper et al. .............. | 455/456.1 |
| 2007/0279277 A1 * | 12/2007 | Kuramoto et al. ............ | 342/147 |
| 2009/0054108 A1 | 2/2009 | Kito | |

* cited by examiner

*Primary Examiner* — David Bilodeau
(74) *Attorney, Agent, or Firm* — CKC & Partners Co., Ltd.

(57) ABSTRACT

A wireless transmission system includes several candidate devices, a wireless transmission interface and a wireless transmission device. The wireless transmission device includes a storage unit, a transmission direction information generating unit and a processing unit. The processing unit receives the device information of each of the candidate devices from each of the candidate devices respectively through the wireless transmission interface. The processing unit calculates transmission direction range according to the transmission direction information, which is generated through the transmission direction information generating unit. The processing unit selects at least one of the candidate devices, which matches the transmission direction range. Wherein, the selected at least one candidate device is taken as at least one transmission target device. The processing unit transmits the information to be transmitted, which is stored in the storage unit, to the transmission target device through the wireless transmission interface.

17 Claims, 4 Drawing Sheets

US 8,738,026 B2

WIRELESS TRANSMISSION SYSTEM, DEVICE AND METHOD

RELATED APPLICATIONS

This application claims priority to Taiwan application no. 099126966, filed Aug. 12, 2010, the entirety of which is incorporated herein by reference.

BACKGROUND

1. Technical Field

The present invention relates to a transmission system, device and method. More particularly, the present invention relates to a wireless transmission system, device and method.

2. Description of Related Art

As technology develops, there are more and more wireless transmission interface, such as Bluetooth, Infrared Data Association (IrDA), IEEE 802.11 series, Wi-Fi, Zigbee. Since wireless transmission interfaces are not restricted by length of physical transmission wires, more and more electrical devices, which support wireless transmission interfaces, are developed.

Wherein, wireless transmission interface are often utilized to transmit information between several devices. In the prior arts, users must know ID, IP address or other identification information of transmission target devices for transmitting information to transmission target devices, which may disturb users. Especially, if users are not familiar with electrical devices, it's hard for users to obtain identification information of electrical devices.

Above all, there is a need to develop an easier way to transmit data wirelessly.

SUMMARY

According to one embodiment of this invention, a wireless transmission system is provided. A wireless transmission device of the wireless transmission system can transmit information to the device in the direction input by users. The wireless transmission system includes several candidate devices, a wireless transmission interface, and a wireless transmission device. The wireless transmission device builds connection with the candidate devices through the wireless transmission interface. Each of the candidate devices includes a device information generating unit. Each of the device information generating units generates device information of each of the candidate devices. The wireless transmission device includes a storage unit, a transmission direction information generating unit and a processing unit. The processing unit is electrically connected with the storage unit and the transmission direction information generating unit. Information to be transmitted is stored in the storage unit. Transmission direction information is generated through the transmission direction information generating unit. The processing unit includes a candidate device information receiving module, a direction range calculating module, a selecting module and an information transmitting module. The candidate device information receiving module receives the device information of each of the candidate devices from each of the candidate devices respectively through the wireless transmission interface. The direction range calculating module calculates transmission direction range according to the transmission direction information. The selecting module selects at least one of the candidate devices, device information of which matches the transmission direction range. Wherein, the selected at least one candidate device is taken as at least one transmission target device. The information transmitting module transmits the information to be transmitted to the transmission target device through the wireless transmission interface.

According to another embodiment of this invention, a wireless transmission device is provided. The wireless transmission device can transmit information to the device in the direction input by users. The wireless transmission device includes a wireless transmission unit, a storage unit, a transmission direction information generating unit and a processing unit. The processing unit is electrically connected with the wireless transmission unit, the storage unit and the transmission direction information generating unit. The wireless transmission unit builds connection with several candidate devices through a wireless transmission interface. Information to be transmitted is stored in the storage unit. Transmission direction information is generated through the transmission direction information generating unit. The processing unit includes a candidate device information receiving module, a direction range calculating module, a selecting module and an information transmitting module. The candidate device information receiving module receives the device information of each of the candidate devices from each of the candidate devices respectively through the wireless transmission interface. The direction range calculating module calculates transmission direction range according to the transmission direction information. The selecting module selects at least one of the candidate devices, device information of which matches the transmission direction range. Wherein, the selected at least one candidate device is taken as at least one transmission target device. The information transmitting module transmits the information to be transmitted to the transmission target device through the wireless transmission interface.

According to another embodiment of this invention, a wireless transmission method is provided. The wireless transmission method makes a wireless transmission device transmit information to the device in the direction input by users. The wireless transmission method includes the following steps: information of several candidate devices is generated. Transmission direction information is generated through a wireless transmission device. Transmission direction range is calculated according to the transmission direction information. At least one of the candidate devices, device information of which matches the transmission direction range, is selected. The selected at least one candidate device is taken as at least one transmission target device. The wireless transmission device transmits information to be transmitted to the transmission target device.

Above all, users can transmit information easily without knowing ID or IP address of the transmission target device. Besides, users may touch a track toward the transmission target device on the touch screen of the wireless transmission device to transmit information, which can be learned easily. In addition, users can input the corresponding position of the transmission target device to the wireless transmission device through sound control or direction keys to transmit data, which can also be learned easily.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
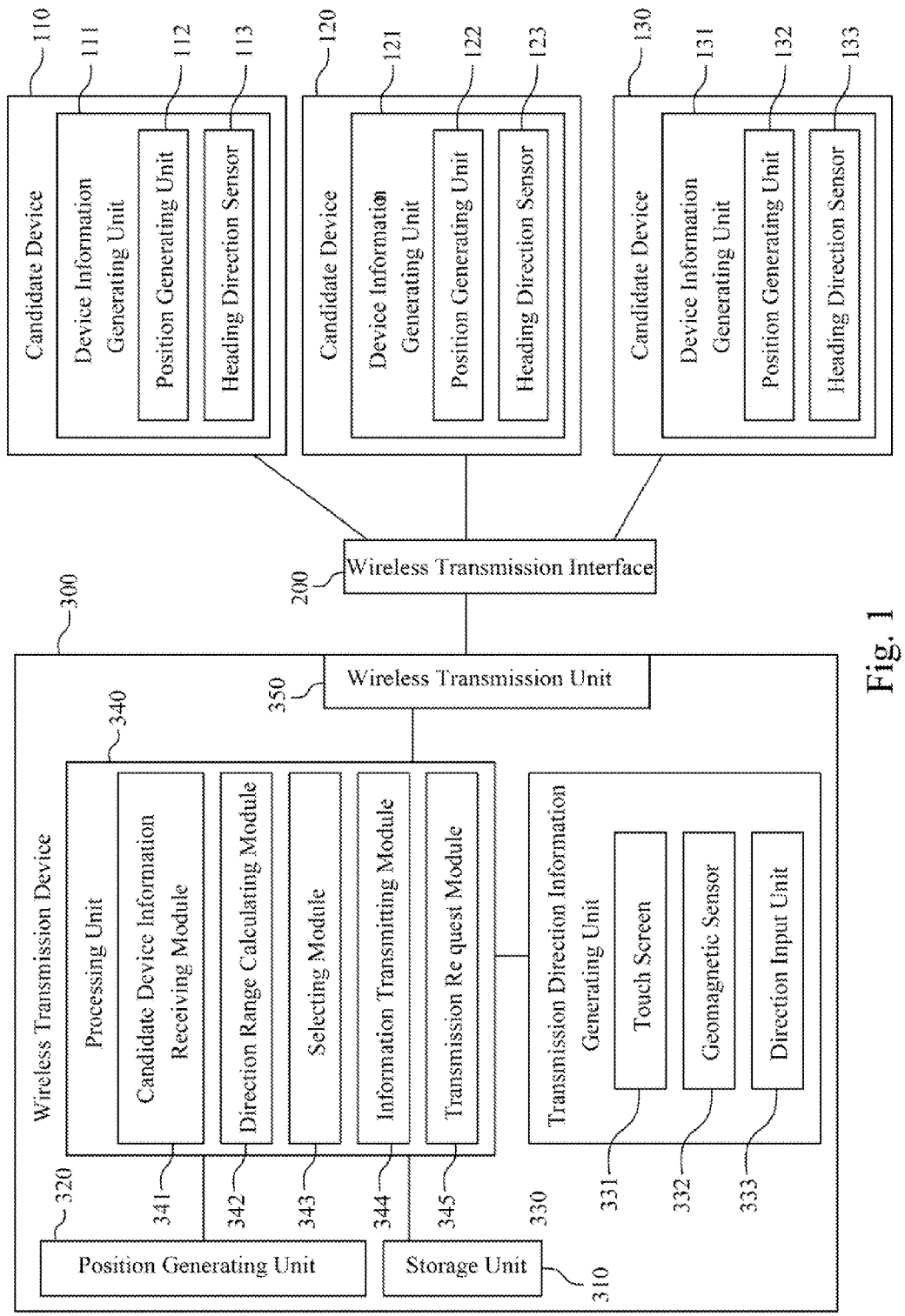
FIG. 1 is a block diagram of a wireless transmission system according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a wireless transmission system according to one embodiment of this invention. A wireless transmission device of the wireless transmission system can transmit information to the device in the direction input by users.

The wireless transmission system includes several candidate devices 110, 120, 130, a wireless transmission interface 200, and a wireless transmission device 300. The wireless transmission interface 200 may be Bluetooth, Infrared Data Association (IrDA), IEEE 802.11 series, Wi-Fi, Zigbee or any other wireless transmission interface. The candidate device 110, 120, 130 and the wireless transmission device 300 support the wireless transmission interface 200.

Each of the candidate devices 110, 120, 130 includes a device information generating unit 111, 121, 131 respectively. The device information generating units 111, 121, 131 generate device information of the candidate devices 110, 120, 130 respectively. The device information of the candidate devices 110, 120, 130 may include candidate device position of the candidate devices 110, 120, 130, heading direction of the candidate devices 110, 120, 130 or other types of device information of the candidate devices 110, 120, 130.

The wireless transmission device 300 includes a storage unit 310, a transmission direction information generating unit 330, a processing unit 340 and a wireless transmission unit 350. The processing unit 340 is electrically connected with the storage unit 310, the transmission direction information generating unit 330 and the wireless transmission unit 350.

The wireless transmission unit 350 builds connection with the candidate devices 110, 120, 130 through the wireless transmission interface 200. Information to be transmitted is stored in the storage unit 310.

The processing unit 340 includes a candidate device information receiving module 341, a direction range calculating module 342, a selecting module 343 and an information transmitting module 344. The candidate device information receiving module 341 receives the device information of the candidate devices from the candidate devices 110, 120, 130 respectively through the wireless transmission interface 350. The direction range calculating module 342 calculates transmission direction range according to the transmission direction information, which is generated through the transmission direction information generating unit 330. The selecting module 343 selects at least one of the candidate devices 110, 120, 130, device information of which matches the transmission direction range. Wherein, the selected at least one candidate device is taken as at least one transmission target device. The information transmitting module 344 transmits the information to be transmitted to the transmission target device through the wireless transmission interface 200.

In one embodiment of this invention, the selecting module 343 may select at least one of the candidate devices 110, 120, 130, candidate device position of which matches the transmission direction range relative to the transmission device position. Therefore, each of the device information generating units 111, 121, 131 may include a position generating unit 112, 122, 132, and the wireless transmission device 300 may include a position generating unit 320, which is electrically connected with the processing unit 340. The position generating units 112, 122, 132 generate candidate device positions of the candidate devices 110, 120, 130 to be included in the device information of the candidate devices 110, 120, 130 respectively. The position generating units 112, 122, 132 may utilize Global Positioning System (GPS), Assisted Global Positioning System (AGPS), Wi-Fi Positioning System or any other positioning method to generate the candidate device positions of the candidate devices 110, 120, 130. Besides, the position generating units 112, 122, 132 may be user interfaces, such as keyboards, Graphical User Interface (GUI) or other user interfaces, to provide users to input the candidate device positions. The position generating unit 320 generates transmission device position of the wireless transmission device 300. Wherein the position generating unit 320 may utilize GPS, AGPS, Wi-Fi Positioning System or any other positioning method to generate the transmission device position of the wireless transmission device 300. Besides, the position generating unit 320 may be a user interface, such as a keyboard, GUI or other user interfaces, to provide users to input the transmission device position. Hence, the selecting module 343 may select at least one of the candidate devices 110, 120, 130, candidate device position of which matches the transmission direction range relative to the transmission device position. Therefore, the user of the wireless transmission device 300 can transmit information to the transmission target device according to the direction of the transmission target device relative to the wireless transmission device 300. In other words, the user of the wireless transmission device 300 can transmit information easily without knowing ID or IP address of the transmission target device.

Besides, the processing unit 340 may further include a transmission request module 345. Before the information transmitting module 344 transmits the information to be transmitted to the transmission target device, the transmission request module 345 transmits transmission request to the transmission target device through the wireless transmission interface 200 to obtain a transmission confirmed reply from the transmission target device. After the information transmitting module 344 receives the transmission confirmed reply, the information transmitting module 344 starts to transmit the information to be transmitted to the transmission target device. Therefore, the user of the transmission target device can decide if receive the information from the wireless transmission device 300 by replying the transmission request or not.

Figure 2:
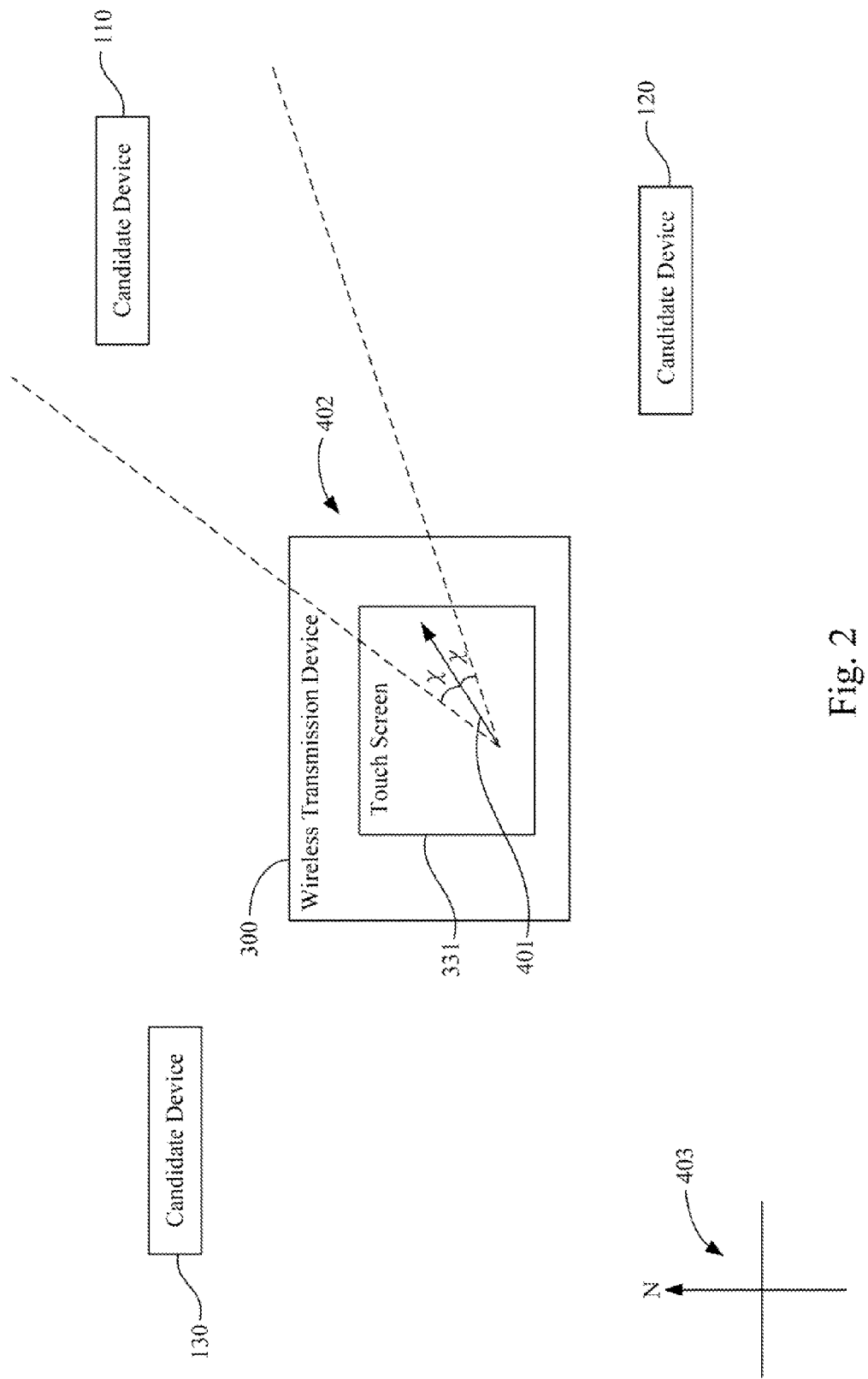
FIG. 2 is an embodiment of the wireless transmission system of this invention.

The transmission direction information generating unit 330 may include a touch screen 331 and a geomagnetic sensor 332. The touch screen 331 senses at least one touched track. The geomagnetic sensor 332 senses present geomagnetic direction relative to the wireless transmission device 300. The geomagnetic sensor 332 may be a digital compass or other types of geomagnetic sensor. Hence, the transmission direction information includes information of the at least one touched track and the present geomagnetic direction relative to the wireless transmission device. Therefore, the direction range calculating module 342 calculates direction of the at least one touched track according to the present geomagnetic direction relative to the wireless transmission device 300 for calculating the transmission direction range. FIG. 2 is an embodiment of the wireless transmission system of this invention. Refer to both FIG. 1 and FIG. 2. The touch screen 331 senses a touched track 401. The geomagnetic sensor 332 senses present geomagnetic direction 403 relative to the wireless transmission device 300. The storage unit 310 further stores a direction deviation x. The direction range calculating module 342 calculates range 402 on the direction of the touched track 401 within the direction deviation x according to the present geomagnetic direction 403 relative to the wireless transmission device 300, and the calculated range 402 is taken as the transmission direction range 402. The processing unit 340 can determine if the candidate device positions of the candidate device 110, 120, 130 relative to the wireless transmission device 300 matches the transmission direction range 402. Hence, in this embodiment, the selecting module 343 selects the candidate devices 110, the candidate device position of which matches the transmission direction range 402. The selected candidate device 110 is taken as the transmission target device. Therefore, users can touch a track toward the transmission target device on the touch screen 331 of the wireless transmission device 300 to transmit information. In other words, the user of the wireless transmission device 300 can transmit information easily without knowing ID or IP address of the transmission target device.

Figure 3:
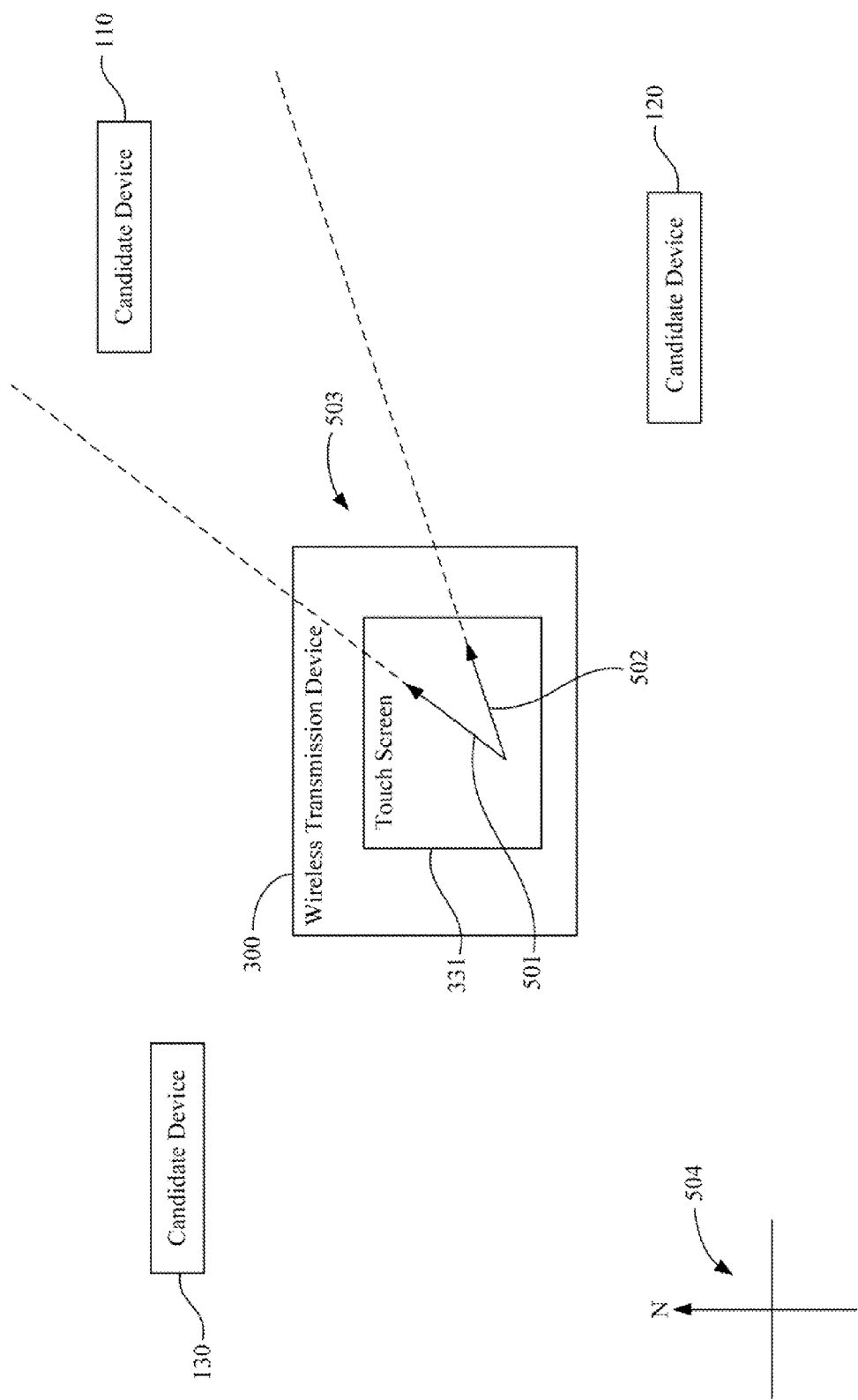
FIG. 3 is another embodiment of the wireless transmission system of this invention.

FIG. 3 is another embodiment of the wireless transmission system of this invention. Refer to both FIG. 1 and FIG. 3. The touch screen 331 senses two touched tracks 501, 502. The geomagnetic sensor 332 senses present geomagnetic direction 504 relative to the wireless transmission device 300. The direction range calculating module 342 calculates range 503 included between the directions of the two touched tracks 501, 502 according to the present geomagnetic direction 504 relative to the wireless transmission device 300, and the calculated range 503 is taken as the transmission direction range 503. The processing unit 340 can determine if the candidate device positions of the candidate device 110, 120, 130 relative to the wireless transmission device 300 matches the transmission direction range 503. Hence, in this embodiment, the selecting module 343 selects the candidate devices 110, the candidate device position of which matches the transmission direction range 503. The selected candidate device 110 is taken as the transmission target device 110. Therefore, users can touch two tracks 501, 502, which include the transmission target device 110, on the touch screen 331 of the wireless transmission device 300 to transmit information. In other words, the user of the wireless transmission device 300 can transmit information easily without knowing ID or IP address of the transmission target device.

In another embodiment of this invention, the transmission direction information generating unit 330 may include a direction input unit 333 and a geomagnetic sensor 332. Users can input transmission direction through the direction input unit 333. The direction input unit 333 may be a direction key, a sound control element, a g-sensor, a gyroscope or any other direction input unit. The geomagnetic sensor 332 senses present geomagnetic direction relative to the wireless transmission device 300. Hence, the transmission direction information includes information of the transmission direction and the present geomagnetic direction relative to the wireless transmission device 300. The direction range calculating module 342 calculates the transmission direction range according to the transmission direction and the present geomagnetic direction relative to the wireless transmission device 300. Therefore, users can input the direction of the transmission target device relative to the wireless transmission device 300 to transmit information. In other words, the user of the wireless transmission device 300 can transmit information easily without knowing ID or IP address of the transmission target device.

In another embodiment of this invention, the transmission direction information generating unit 330 may include a direction input unit 333 and a geomagnetic sensor 332, and each of the device information generating unit 111, 121, 131 includes a heading direction sensor 113, 123, 133 respectively. Users can input transmission direction through the direction input unit 333. The heading direction sensor 113, 123, 133 sense heading directions of the candidate devices 110, 120, 130 respectively. The heading direction sensor 113, 123, 133 may include a digital compass or other elements, which can senses heading directions. The heading directions of the candidate devices 110, 120, 130 are included in the device information of the candidate devices 110, 120, 130. The processing unit 340 calculates heading direction of the wireless transmission device 300 according to the transmission direction and the present geomagnetic direction relative to the wireless transmission device. Then, the processing unit 340 selects at least one of the candidate devices 110, 120, 130, heading direction of which corresponds to the heading direction of the wireless transmission device 300, and the selected at least one candidate device is taken as the at least one transmission target device. For example, if a user input a heading direction "North East" through the direction input unit 333, the wireless transmission device 300 may transmit the information to be transmitted to at least one of the candidate devices 110, 120, 130, heading direction of which is "South West", which corresponds to the input heading direction "North East". Therefore, even if the position can't be obtained, the information can still be transmitted according to the heading direction.

Figure 4:
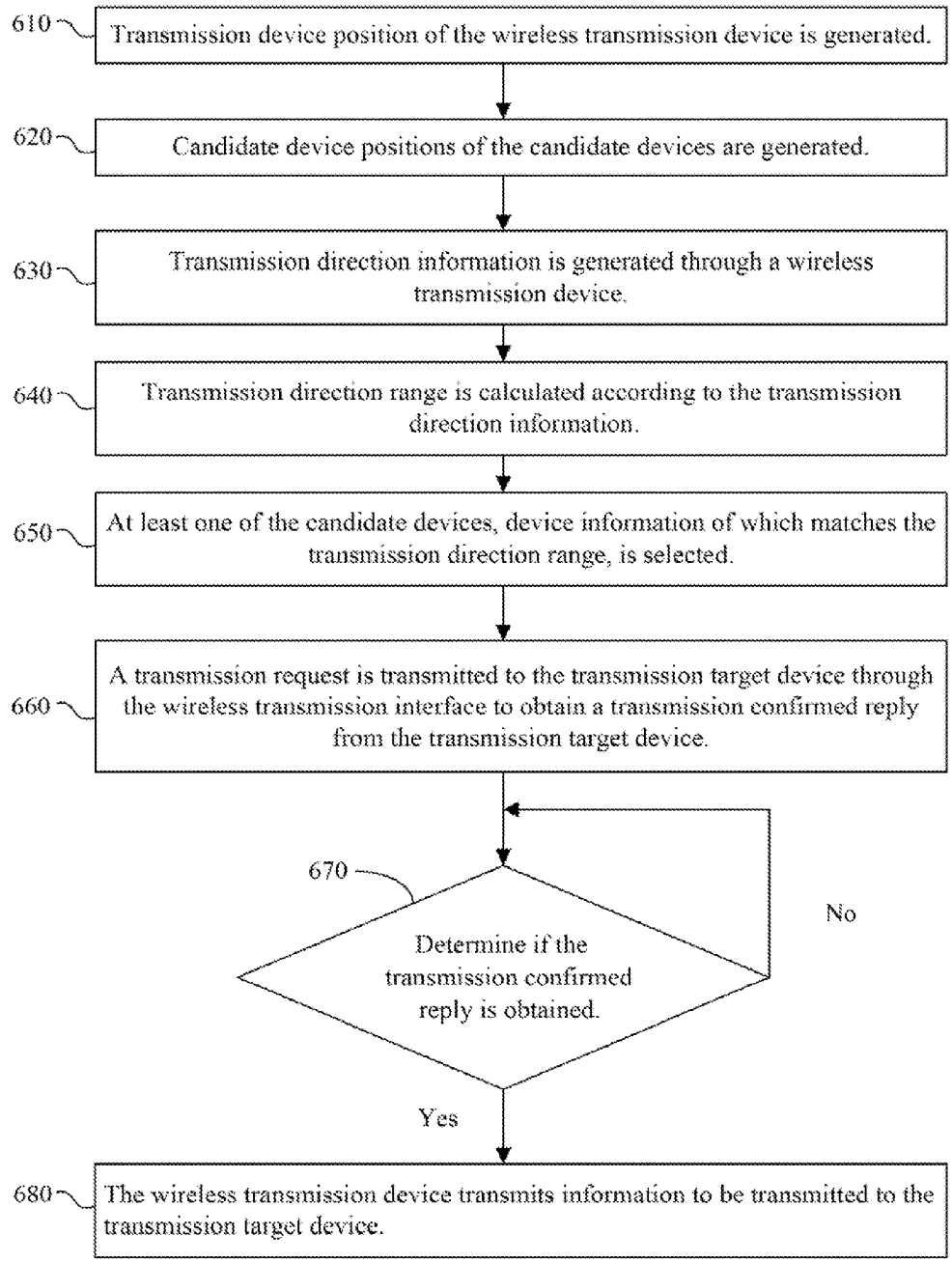
FIG. 4 is a flow diagram of a wireless transmission method according to another embodiment of this invention.

FIG. 4 is a flow diagram of a wireless transmission method according to another embodiment of this invention. The wireless transmission method makes a wireless transmission device transmit information to the device in the direction input by users. The wireless transmission method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

The wireless transmission method 600 includes the following steps.

In step 630, transmission direction information is generated through a wireless transmission device. The wireless transmission device supports Bluetooth, IrDA, IEEE 802.11 series, Wi-Fi, Zigbee or any other wireless transmission standard.

In step 640, transmission direction range is calculated according to the transmission direction information.

In step 650, at least one of the candidate devices, device information of which matches the transmission direction range, is selected to be taken as a transmission target device. Wherein, the candidate devices support Bluetooth, IrDA, IEEE 802.11 series, Wi-Fi, Zigbee or any other wireless transmission standard. In addition, step 640, 650 can be executed by the wireless transmission device, the candidate devices or any other device, which should not be limited in this disclosure. Besides, the device information of the candidate devices is generated before the selection of step 650. The device information of the candidate devices may include candidate device position of the candidate devices, heading direction of the candidate devices or other types of device information of the candidate devices.

In step 680, the wireless transmission device transmits information to be transmitted to the transmission target device. Wherein, the wireless transmission may transmit information to be transmitted (step 680) utilizing Bluetooth, IrDA, IEEE 802.11 series, Wi-Fi, Zigbee or any other wireless transmission standard.

Wherein, the selection in step 650 may be made according to the position of the candidate devices relative to the position of the wireless transmission device. Therefore, before step 650, transmission device position of the wireless transmission device may be generated (step 610). In step 620, candidate device positions of the candidate devices are generated. Wherein, GPS, AGPS, Wi-Fi Positioning System or any other positioning method may be utilized to generate the transmission device position of the wireless transmission device (step 610) or to generate the candidate device positions of the candidate devices (step 620). In addition, users can input through a user interface, such as a keyboard, GUI or other user interfaces, to generate the transmission device position of the wireless transmission device (step 610) or to generate the candidate device positions of the candidate devices (step 620). Therefore, step 650 may include the step of selecting at least one of the candidate devices, candidate device position of which matches the transmission direction range relative to the transmission device position, to be taken as the transmission target device.

Before, step 680, a transmission request may be transmitted to the transmission target device through the wireless transmission interface to obtain a transmission confirmed reply from the transmission target device (step 660). Then, in step 670, the wireless transmission device determines if the transmission confirmed reply is obtained. If the transmission confirmed reply is obtained, the wireless transmission device starts to transmit information to be transmitted (step 680). If the transmission confirmed reply is not obtained, the wireless transmission device keeps determining if the transmission confirmed reply is obtained (step 670).

Besides, the transmission direction information can be generated through a touch screen of the wireless transmission device (step 630). Hence, generating the transmission direction information (step 630) may include the following steps: at least one touched track is sensed through a touch screen of the wireless transmission device. In addition, present geomagnetic direction relative to the wireless transmission device is sensed. Then, direction of the at least one touched track is calculated according to the present geomagnetic direction relative to the wireless transmission device. Information of the direction of the at least one touched track and the present geomagnetic direction relative to the wireless transmission device can be included in the transmission direction information.

Hence, the transmission direction range can be calculated according to the information of the direction of the at least one touched track and the present geomagnetic direction relative to the wireless transmission device (step 640). Refer to both FIG. 2 and FIG. 4. According to one embodiment of this invention, the touch screen 331 of the wireless device 300 senses a touched track 401. Besides, present geomagnetic direction 403 relative to the wireless transmission device 300 is sensed. Then, range 402 on the direction of the touched track 401 within the direction deviation x is calculated according to the present geomagnetic direction 403 relative to the wireless transmission device 300 (step 640). Wherein, if the candidate device positions of the candidate device 110, 120, 130 relative to the wireless transmission device 300 matches the transmission direction range 402 may be determined according to the present geomagnetic direction 403 relative to the wireless transmission device 300. Hence, in this embodiment, the candidate devices 110, the candidate device position of which matches the transmission direction range 402, may be selected (step 650) to be taken as the transmission target device. Therefore, users can touch a track toward the transmission target device on the touch screen 331 of the wireless transmission device 300 to transmit information. In other words, the user of the wireless transmission device 300 can transmit information easily without knowing ID or IP address of the transmission target device.

Refer to both FIG. 3 and FIG. 4. According to another embodiment of this invention, the touch screen 331 of the wireless transmission device senses two touched tracks 501, 502. Besides, the present geomagnetic direction 504 relative to the wireless transmission device 300 is sensed. Hence, range 503 included between the directions of the two touched tracks 501, 502 is calculated according to the present geomagnetic direction 504 relative to the wireless transmission device 300 to be taken as the transmission direction range (step 640). Wherein, if the candidate device positions of the candidate device 110, 120, 130 relative to the wireless transmission device 300 matches the transmission direction range 503 may be determined according to the present geomagnetic direction 504 relative to the wireless transmission device 300. Hence, in this embodiment, the candidate devices 110, the candidate device position of which matches the transmission direction range 503, is selected to be taken as the transmission target device 110 (step 650). Therefore, users can touch two tracks 501, 502, which include the transmission target device 110, on the touch screen 331 of the wireless transmission device 300 to transmit information. In other words, the user of the wireless transmission device 300 can transmit information easily without knowing ID or IP address of the transmission target device.

In another embodiment of this invention, the transmission direction information may be generated through a direction input unit of the wireless transmission device (step 630). The direction input unit of the wireless transmission device may be a direction key, a sound control element, a g-sensor, a gyroscope or any other direction input unit. Besides, present geomagnetic direction relative to the wireless transmission device may be sensed. Hence, information of the transmission direction and the present geomagnetic direction relative to the wireless transmission device can be included in the transmission direction information for calculating the transmission direction range (step 640). Therefore, users can input the direction of the transmission target device relative to the wireless transmission device through the direction input unit to transmit information. In other words, the user of the wireless transmission device can transmit information easily without knowing ID or IP address of the transmission target device.

In another embodiment of this invention, the transmission direction information may be generated through a direction input unit of the wireless transmission device (step 630). The direction input unit of the wireless transmission device may be a direction key, a sound control element, a g-sensor, a gyroscope or any other direction input unit. Besides, present geomagnetic direction relative to the wireless transmission device may be sensed. Hence, the heading direction of the wireless transmission device may be calculated according to the transmission direction and the present geomagnetic direction relative to the wireless transmission device. Then, step 650 may include the step of selecting at least one of the candidate devices, heading direction of which corresponds to the heading direction of the wireless transmission device, to be taken as the at least one transmission target device. Therefore, even if the positions of the wireless transmission device or the candidate devices can't be obtained, the information can still be transmitted according to the heading direction.

Above all, users can transmit information easily without knowing ID or IP address of the transmission target device. Besides, users may touch a track toward the transmission target device on the touch screen of the wireless transmission device to transmit information, which can be learned easily. In addition, users can input the corresponding position of the transmission target device to the wireless transmission device through sound control or direction keys to transmit data, which can also be learned easily.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wireless transmission system, comprising:
   a plurality of candidate devices, each of the candidate devices comprises:
      a device information generating unit for generating device information of each of the candidate devices;
   a wireless transmission interface; and
   a wireless transmission device for building connection with the candidate devices through the wireless transmission interface, wherein the wireless transmission device comprises:
   a storage unit for storing information to be transmitted;
   a transmission direction information generating unit for generating transmission direction information, wherein the transmission direction information generating unit comprises:
      a direction input unit for imputting transmission direction; and
      a geomagnetic sensor for sensing present geomagnetic direction relative to the wireless transmission device,
      wherein the transmission direction information comprises information of the transmission direction and the present geomagnetic direction relative to the wireless transmission device; and
   a processing unit, electrically connected with the storage unit and the transmission direction information generating unit, wherein the processing unit comprises:
      a candidate device information receiving module for receiving the information of each of the candidate devices from each of the candidate devices respectively through the wireless transmission interface;
      a direction range calculating module for calculating transmission direction range according to the transmission direction information, wherein the direction range calculating module calculates the transmission direction range according to the transmission direction and the present geomagnetic direction relative to the wireless transmission device;
      a selecting module for selecting at least one of the candidate devices, device information of which matches the transmission direction range, wherein the selected at least one candidate device is taken as at least one transmission target device; and
      an information transmitting module, transmitting the information to be transmitted to the transmission target device through the wireless transmission interface.

2. The wireless transmission system of claim 1, wherein each of the device information generating unit comprises:
   a first position generating unit for generating candidate device position of each of the candidate devices to be included in the device information of each of the candidate devices,
   wherein the wireless transmission device further comprises:
      a second position generating unit, electrically connected with the processing unit, wherein the second position generating unit generates transmission device position of the wireless transmission device,
   wherein the selecting module selects at least one of the candidate devices, candidate device position of which matches the transmission direction range relative to the transmission device position, and the selected at least one candidate device is taken as the at least one transmission target device.

3. The wireless transmission system of claim 1, wherein the transmission direction information generating unit further comprises:
   a touch screen for sensing at least one touched track,
   wherein the transmission direction information further comprises information of the at least one touched track, and the direction range calculating module calculates direction of the at least one touched track according to the present geomagnetic direction relative to the wireless transmission device for calculating the transmission direction range.

4. The wireless transmission system of claim 3, wherein the storage unit further stores a direction deviation, the direction range calculating module calculates range on the direction of the at least one touched track within the direction deviation according to the present geomagnetic direction relative to the wireless transmission device, and the calculated range is taken as the transmission direction range.

5. The wireless transmission system of claim 3, wherein the number of the at least one touched track is two, the direction range calculating module calculates range included between the directions of the two touched tracks according to the present geomagnetic direction relative to the wireless transmission device, and the calculated range is taken as the transmission direction range.

6. The wireless transmission system of claim 1, wherein the processing unit further comprises:
   a transmission request module for transmitting a transmission request to the transmission target device through the wireless transmission interface to obtain a transmission confirmed reply from the transmission target device before transmitting the information to be transmitted to the transmission target device, wherein the wireless transmission device starts to transmit the information to be transmitted to the transmission target device after the transmission confirmed reply is received by the wireless transmission device.

7. The wireless transmission system of claims 1,
wherein each of the device information generating unit comprises:
a heading direction sensor for sensing heading direction of each of the candidate devices, wherein the heading direction of each of the candidate devices is included in the device information of each of the candidate devices,
wherein the processing unit calculates heading direction of the wireless transmission device according to the transmission direction and the present geomagnetic direction relative to the wireless transmission device, and further selects at least one of the candidate devices, heading direction of which corresponds to the heading direction of the wireless transmission device.

8. A wireless transmission device, comprising:
a wireless transmission unit for building connection with a plurality of candidate devices through a wireless transmission interface;
a storage unit for storing information to be transmitted;
a transmission direction information generating unit generating transmission direction information, wherein the transmission direction information generating unit comprises:
a direction input unit for inputting transmission direction; and
a geomagnetic sensor for sensing present geomagnetic direction relative to the wireless transmission device,
wherein the transmission direction information comprises information of the transmission direction and the present geomagnetic direction relative to the wireless transmission device; and
a processing unit, electrically connected with the wireless transmission unit, the storage unit and the transmission direction information generating unit, wherein the processing unit comprises:
a candidate device information receiving module, receiving device information of each of the candidate devices from each of the candidate devices respectively through the wireless transmission interface;
a direction range calculating module for calculating transmission direction range according to the transmission direction information, wherein the direction range calculating module calculates the transmission direction range according to the transmission direction and the present geomagnetic direction relative to the wireless transmission device;
a selecting module for selecting at least one of the candidate devices, device information of which matches the transmission direction range, wherein the selected at least one candidate device is taken as at least one transmission target device; and
an information transmitting module, transmitting the information to be transmitted to the transmission target device through the wireless transmission interface.

9. The wireless transmission device of claim 8, wherein the transmission direction information generating unit further comprises:
a touch screen for sensing at least one touched track,
wherein the transmission direction information further comprises information of the at least one touched track, and the direction range calculating module calculates direction of the at least one touched track according to the present geomagnetic direction relative to the wireless transmission device for calculating the transmission direction range.

10. The wireless transmission device of claim 9, wherein the storage unit further stores a direction deviation, the direction range calculating module calculates range on the direction of the at least one touched track within the direction deviation according to the present geomagnetic direction relative to the wireless transmission device, and the calculated range is taken as the transmission direction range.

11. The wireless transmission device of claim 9, wherein the number of the at least one touched track is two, the direction range calculating module calculates range included between the directions of the two touched tracks according to the present geomagnetic direction relative to the wireless transmission device, and the calculated range is taken as the transmission direction range.

12. A wireless transmission method, comprising:
generating device information of a plurality of candidate devices;
generating transmission direction information through a wireless transmission device, wherein the step of generating the transmission direction information through the wireless transmission device comprises:
receiving transmission direction through a direction input unit of the wireless transmission device; and
sensing present geomagnetic direction relative to the wireless transmission device, wherein the transmission direction information comprises information of the transmission direction and the present geomagnetic direction relative to the wireless transmission device;
calculating transmission direction range according to the transmission direction information, wherein the transmission direction range is calculated according to the transmission direction and the present geomagnetic direction relative to the wireless transmission device;
selecting at least one of the candidate devices, device information of which matches the transmission direction range, wherein the selected at least one candidate device is taken as at least one transmission target device; and
making the wireless transmission device transmit information to be transmitted to the transmission target device.

13. The wireless transmission method of claim 12, wherein the step of generating the device information of the candidate devices comprises:
generating transmission device position of the wireless transmission device;
generating candidate device position of each of the candidate devices to be included in the device information of each of the candidate devices,
wherein the step of selecting at least one of the candidate devices, the device information of which matches the transmission direction range, comprises:
selecting at least one of the candidate devices, candidate device position of which matches the transmission direction range relative to the transmission device position.

14. The wireless transmission method of claim 12, wherein the step of generating the transmission direction information through the wireless transmission device further comprises:
sensing at least one touched track through a touch screen of the wireless transmission device; and
calculating direction of the at least one touched track according to the present geomagnetic direction relative to the wireless transmission device,
wherein information of the direction of the at least one touched track is further included in the transmission direction information, wherein the transmission direction range is calculated further according to the direction of the at least one touched track.

15. The wireless transmission method of claim 14, wherein the step of calculating the transmission direction range according to the transmission direction information further comprises:
    calculating range on the direction of the at least one touched track within a direction deviation according to the present geomagnetic direction relative to the wireless transmission device, wherein the calculated range is taken as the transmission direction range.

16. The wireless transmission method of claim 14, wherein the number of the at least one touched track is two, and the step of calculating the transmission direction range according to the transmission direction information further comprises:
    calculating range included between the directions of the two touched tracks according to the present geomagnetic direction relative to the wireless transmission device, wherein the calculated range is taken as the transmission direction range.

17. The wireless transmission method of claim 12, wherein generating the transmission direction information through the wireless transmission device comprises:
    calculating heading direction of the wireless transmission device according to the transmission direction and the present geomagnetic direction relative to the wireless transmission device, wherein the step of selecting at least one of the candidate devices comprises:
    selecting at least one of the candidate devices, heading direction of which corresponds to the heading direction of the wireless transmission device.

* * * * *